(12) United States Patent
Darling et al.

(10) Patent No.: US 7,754,364 B2
(45) Date of Patent: Jul. 13, 2010

(54) PEM FUEL CELL SYSTEM WITH A POROUS HYDROPHOBIC PLUG FOR MAINTAINING SYSTEM BACK PRESSURE AND METHODS FOR DESIGNING THE PLUG AND FOR DESIGNING SYSTEMS FOR USING THE PLUG

(76) Inventors: Robert Darling, 301 Abbe Rd., Ext., South Windsor, CT (US) 06074; Carl A. Reiser, 25 Orchard St., Unit #19, Stonington, CT (US) 06378; William J. Bajorek, 5 Grace La., Cromwell, CT (US) 06416

( * ) Notice: Subject to any disclaimer, the term of this patent is extended or adjusted under 35 U.S.C. 154(b) by 1225 days.

(21) Appl. No.: 11/326,762

(22) Filed: Jan. 6, 2006

(65) Prior Publication Data

US 2007/0160883 A1   Jul. 12, 2007

(51) Int. Cl.
*H01M 8/04* (2006.01)
(52) U.S. Cl. ............................. 429/26; 429/25; 429/32; 429/38

(58) Field of Classification Search .................... 429/25, 429/26, 38, 32
See application file for complete search history.

(56) References Cited

U.S. PATENT DOCUMENTS

2003/0044656 A1*   3/2003   Wood ........................ 429/19

* cited by examiner

*Primary Examiner*—Jane Rhee
(74) *Attorney, Agent, or Firm*—William W. Jones; Andrew Gathy

(57) ABSTRACT

A polymer electrolyte membrane (PEM) fuel cell power plant is cooled evaporatively by a non-circulating pressurized water coolant system. The coolant system utilizes a hydrophobic porous plug for bleeding air from the coolant water while maintaining coolant back pressure in a coolant flow field of the system. Furthermore, there is a first method for identifying appropriate parameters of the hydrophobic porous plug for use with a known particular coolant system; and a second method for determining proper operating conditions for a fuel cell water coolant system which can operate with a hydrophobic porous plug closure having known physical parameters.

5 Claims, 2 Drawing Sheets

PEM FUEL CELL SYSTEM WITH A POROUS HYDROPHOBIC PLUG FOR MAINTAINING SYSTEM BACK PRESSURE AND METHODS FOR DESIGNING THE PLUG AND FOR DESIGNING SYSTEMS FOR USING THE PLUG

TECHNICAL FIELD

The present invention relates to a polymer electrolyte membrane (PEM) fuel cell power plant which is cooled evaporatively by a non-circulating water coolant system. This invention also relates to a coolant system of the character described which utilizes a hydrophobic porous plug for maintaining coolant back pressure in the coolant flow field of the system. This invention also relates to a method for identifying appropriate parameters of the hydrophobic porous plug for use with a known particular coolant system. The method of this invention can also be used to identify proper operating conditions for a fuel cell coolant system of the character described which utilizes the hydrophobic porous plug having known physical parameters.

BACKGROUND OF THE INVENTION

Polymer electrolyte membrane fuel cell assemblies are relatively low temperature low operating pressure fuel cell assemblies that utilize a catalyzed polymer membrane electrolyte to process air and a hydrogen-rich fuel to produce electricity and water. PEM fuel cells are well suited for use in mobile applications such as automobiles, buses, and the like, because they are relatively compact, light in weight and operate at essentially ambient pressure.

It would be desirable to remove the diffused air and fuel from the water coolant so that the coolant will not be diluted and its cooling capability degraded and degrade its ability to prevent the porous bodies in the cell from drying out. The diffused air and fuel removal operation should be performed while preventing the coolant water from escaping from the coolant flow field.

We have devised a structure and method for effectively removing the diffused air and fuel from the coolant while maintaining a proper back pressure in the coolant flow field and preventing the water coolant from escaping from the coolant flow field.

DISCLOSURE OF THE INVENTION

This invention relates to a PEM fuel cell power plant having hydrophobic porous plug components which are able to remove diffused gas from the coolant flow fields without removing water from the coolant flow fields. This invention also relates to a method of operating a PEM fuel cell power plant which includes the porous hydrophobic plugs installed in the fuel cells, which fuel cells have known operating pressure values. The plugs ensure the maintenance of proper back pressure whereby gases in the coolant flow fields will be purged therefrom through the plugs, while liquid coolant will be prevented from migrating through the plugs from the coolant flow fields.

The fuel cell power plant includes a conventional catalyzed polymer membrane electrode having an anode side which receives a hydrogen-rich fuel stream and a cathode side which receives an oxygen-containing reactant stream. A cooling flow field is disposed in heat exchange relationship with the cathode or anode side so as to cool the fuel cell during operation thereof. The coolant used in the system is typically water, but may be other liquid coolants if so desired. The coolant in the cooling flow field does not circulate through the fuel cell assembly and the cooling is accomplished by evaporation of the coolant into the air stream in the cathode flow field. Air and other gases which may diffuse into the water in the coolant flow field are purged from the water coolant in the coolant flow field through the porous plug which passes the gases there through but will not pass the coolant water there through.

BRIEF DESCRIPTION OF THE DRAWINGS

Certain objects and advantages of this invention will become more readily apparent to one skilled in the art from the following detailed description of a preferred embodiment of the invention when taken in conjunction with the accompanying drawings in which.

SPECIFIC MODE FOR CARRYING OUT THE INVENTION

Figure 1:
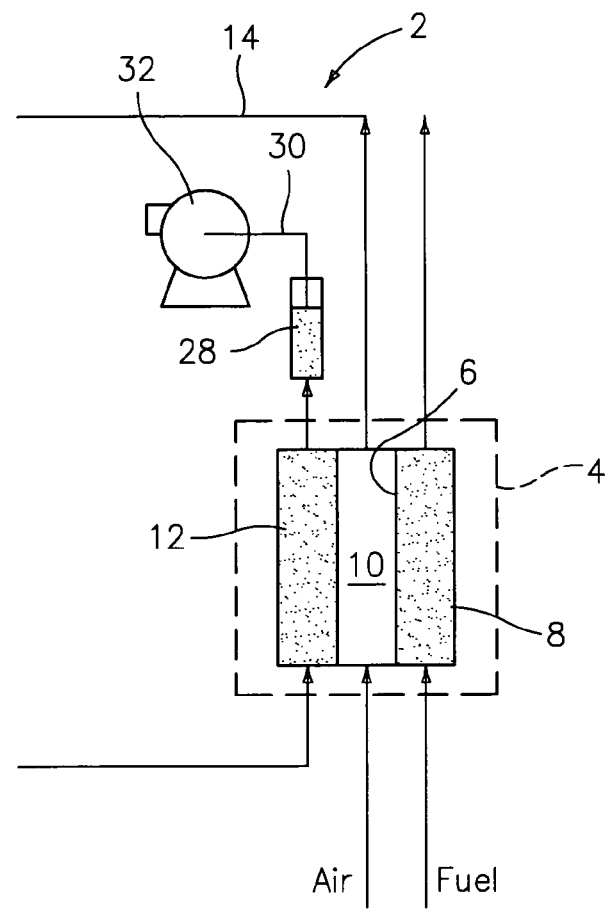
FIG. 1 is a schematic view of a portion of a PEM fuel cell assembly which is used in the power plant of this invention.

Referring now to the drawings, FIG. 1 is a schematic view of a portion of a PEM cell operating system, denoted generally by the numeral 2, of a fuel cell power plant formed in accordance with this invention. The fuel cell 4 includes a catalyzed polymer electrolyte membrane 6 which is interposed between a fuel reactant flow field 8 (the anode side) and an oxidant reactant flow field 10 (the cathode side). A coolant flow field 12 is disposed adjacent to the anode or cathode side 8 or 10 of the fuel cell 4. The coolant flow field 12 contains a non-circulating liquid coolant, preferably water, that serves to evaporatively cool the active area of the PEM cell subassembly 2 so as to maintain the proper operating temperature of the fuel cell 4. The coolant flow field 12 is of conventional construction for evaporative cooling of the anode or cathode side of the fuel cell 4. The coolant flow field 12 includes a grid-like coolant channel (which can be formed in either the anode or cathode flow field porous plates) through which the coolant passes from an inlet end to an outlet end of the coolant flow field 12. The innermost wall of the coolant flow field 12 is formed from one wall of the anode side 8 or cathode side 10 of the fuel cell 4 and is formed from a porous material so that coolant water can pass through the porous wall into the fuel or air stream in the anode or cathode side of the fuel cell 4. The coolant water that passes into the fuel or air stream will vaporize in the fuel or air stream thus cooling the cell 4. At the same time, fuel or air from the anode or cathode of the cell will diffuse into the water coolant in the coolant flow field.

Figure 2:
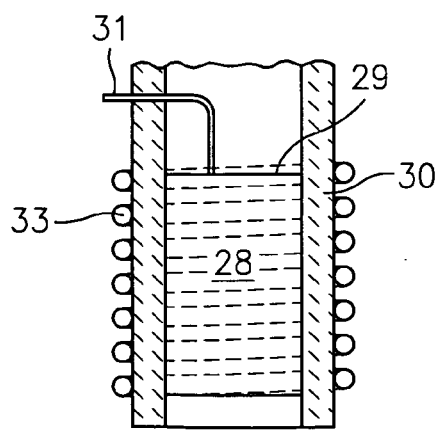
FIG. 2 is a fragmented axial sectional view of a line which has a hydrophobic porous plug positioned therein for use in the assembly of FIG. 1.

During the reaction, the hydrogen in the fuel and the oxygen in the air are converted to electrons and water. The reaction product water is formed in the air stream in the cathode side 10 of the cell 4 and is removed, along with residual air and the evaporated coolant water, as cathode effluent through a line 14. The coolant flow field 12 is kept under a slightly lower pressure than fuel and air by an optional vacuum pump 32 at its outlet end which pump 32 is connected to the coolant flow field 12 through a line 30. A porous plug 28 which is at least partially hydrophobic, is disposed in the line 30 as shown in FIG. 2. The vacuum pump 32, if utilized, will draw any gases, such as air and/or hydrogen, which may be present in the coolant flow field 12 out of the coolant flow field 12 through the porous plug 28. The pores and the thickness of the plug 28 are sized so as to allow passage of gases through the plug 28 but prevent passage of the coolant liquid there through. Gases drawn out of the coolant flow field 12 are then vented to the ambient surroundings. The porous plug 28 can be made at least partially from an open weave Teflon or the like hydrophobic material.

The air which passes through the plug 28 and into the line 30 will be hot and will be saturated with water vapor. Thus, there is a possibility that water may condense in, or on, the exit end 29 of the porous plug 28 and interfere with air passing through the plug 28. This problem can be avoided by limiting the amount of water which can condense in the plug 28. One way to accomplish this goal is to provide a wick 31 that is positioned in or on the exit end 29 of the plug 28 and extends through the wall of the line 30. The wick 31 will draw condensed water out of the plug 28 and the water will migrate through the wick 31 where it can be evaporated outside of the line 30 by means of a stream of hot air, or the like. Another way to deal with this potential problem is to position a heater outside of the line 30 so as to prevent or minimize water condensation in the plug 28. The heater may take the form of an electric heater coil 33 which operates to directly or indirectly heat the plug 28 so as to prevent water condensation in the plug 28. It might also be feasible to heat that portion of the line 30 in another fashion such as, for example, with warm air, so as to accomplish the same result.

As noted above, it would also be highly desirable to be able to design the porous hydrophobic plug so as to ensure maintenance of operating back pressure in the coolant system and rid the coolant of dissolved air by utilizing known operating conditions of the fuel cell system to derive physical parameters of an operative plug. Likewise, it would be highly desirable to be able to identify operating conditions for a fuel cell system which will be appropriate for use with a porous hydrophobic plug having known physical parameters. Therefore, another aspect of this invention relates to a method for designing a porous plug for use in a coolant system having known parameters, and also to a method for designing a coolant system for use with a porous plug having known parameters.

As noted above, an optional vacuum may be applied to the coolant flow field so as to draw any gases present in the coolant out of the coolant flow field through a hydrophobic porous plug that closes off one end of the coolant flow field. The plug will allow passage of gases from the coolant flow field to ambient surroundings, but will prevent escape of any liquid from the coolant flow field. Thus, the water coolant cannot escape into ambient surroundings from the coolant flow field. It is noted that if the resistance of the plug to liquid flow is too low, then coolant water will leak through the plug and will be lost from the system. If the resistance of the plug to gas flow is too high, gas ingestion into the coolant channels will occur followed by gas breakthrough through porous plates in the fuel cells which may result in cell failure.

Identifying Appropriate Plug Parameters for Use With a Known Coolant System

Figure 3:
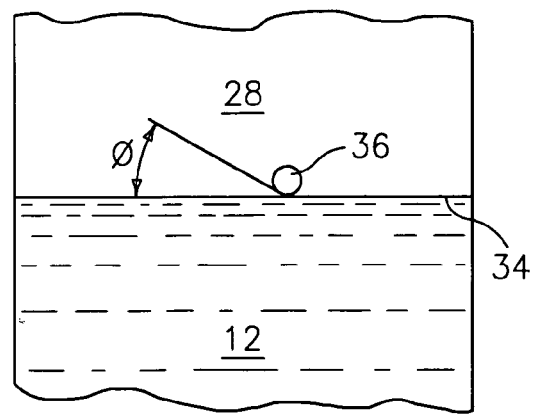
FIG. 3 is a schematic fragmented axial sectional view of the interface between the porous plug and the coolant showing a drop of liquid coolant adjacent to and touching the porous plug.

The size of the pores in the woven hydrophobic material and the porosity of the plug 28 formed therefrom can be essentially independently controlled. The utility or operability (resistance) of a plug for any particular coolant pressure system is defined by the amount of hydraulic pressure that it can be subjected to without allowing the water coolant to pass through it. The two factors that determine the necessary hydraulic resistance of a plug 28, i.e., a low resistance which is between that which will allow water to flow through the plug and a high resistance which will cause gas ingestion into the coolant channels and gas breakthrough, are the internal porosity of the plug and the pore diameter. Thus, if one knows the hydraulic pressure at the outlet of a particular coolant field then one can use that known value in the design of an operative porous plug which can be used to plug the outlet end of the coolant field in question. The pore diameter d of a particular plug can be determined by solving the equation:

$$d = \frac{4\partial \cos \emptyset}{P_b}$$

wherein: $P_b$ is the bubble pressure of the plug; $\partial$ is the surface tension of water; $\emptyset$ is the contact angle between the coolant and the surface of the plug; and d is the pore diameter of the largest pore in the plug (in this case, it is presumed, for the sake of clarity, that all of the pores in the plug have the same diameter). An operative $P_b$ is one where $P_b$ is greater than the hydraulic or water pressure ($P_{out}$) at the coolant flow field outlet minus the gas pressure ($P_{amb}$) downstream of the plug. Since the coolant outlet hydraulic pressure is known and the downstream gas pressure is known, an operative plug bubble pressure can be calculated. Once an operative $P_b$ is known, an operative plug pore size d can be calculated for the plug. FIG. 3 is a symbolic illustration of what is meant by the contact angle between the coolant 12 and the surface of the plug 28. What is shown is the interface 34 between the coolant 12 and the hydrophobic porous plug 28. The numeral 36 indicates a hypothetical drop of the liquid coolant positioned against the plug surface. In this example, the coolant is considered to be pure water.

The known plug porosity can then be used to calculate a plug thickness that will provide the desired operating result. The length can be calculated by solving the following equation:

$$L < \frac{E^3 d^2}{180(1-E)^2} \cdot \frac{\Delta P}{\mu} \cdot \frac{A}{Q}$$

wherein: E is the void volume fraction of the plug; d is the plug pore diameter; $\Delta P$ is the coolant pressure at the flow field outlet minus the gas pressure outside of the cell; A is the area of the plug; $\mu$ is the coolant viscosity; and Q is the gas ingestion flow rate. It will be noted that the void volume fraction of the plug is the porosity of the material from which the plug is to be made.

One can calculate $\Delta P$ by solving the following equation:

$$\Delta P = P_{out} - P_{amb}$$

wherein $P_{out}$ is the known coolant exit pressure from the coolant flow field; and $P_{amb}$ is the gas pressure downstream of the plug. Thus $\Delta P$ can be readily calculated.

Once $\Delta P$ is calculated, the plug length L can be calculated and the operating characteristics for a plug for use with the known coolant flow field parameters are established and an appropriate closure plug can be produced.

Identifying Appropriate Coolant System Parameters for Use With a Known Plug

When following this procedure, the characteristics of the plug are known, thus the resistance range to fluid penetration of the plug will be known. This means that the minimum pressure needed to force gases through the plug (gas pressure) will be known and the minimum pressure needed to force liquids through the plug (breakthrough pressure) will also be known. With these known limitations in hand, a suitable pressure out value can be selected for the system, which pressure out value lies between the gas pressure and the gas pressure plus 4∂ cos Ø/d. With the pressure out value being selected what remains to be determined are a suitable coolant pressure in, i.e., the pressure of the coolant as it enters the cooling flow field, and the pressure drop while in the cooling flow field. Once these values are determined, one can design a cooling flow field that will operate properly with the plug in question. In designing the cooling system of this invention, it will be assumed that the coolant is water. As noted above, the value of ΔP can be determined by solving the following equation:

$$\Delta P = P_{out} - P_{amb}.$$

Since $P_{out}$ and $P_{amb}$ are known, a ΔP which will be operative for the plug having known characteristics can be readily determined. The final parameter which must be determined is the pressure in. This parameter depends largely on the design of the coolant flow field. The coolant flow fields which are typically used in connection with PEM fuel cells have an outer wall which faces away from the active area of the cell and an inner porous wall which faces the cathode or anode reactant side of the cell. Water in the coolant flow field passes through the porous wall into the air reactant stream where the water evaporates to cool the cell. The coolant flow field is formed with a coolant passage having an inlet at one end of the cell and an outlet at the other end of the cell.

Figure 4:
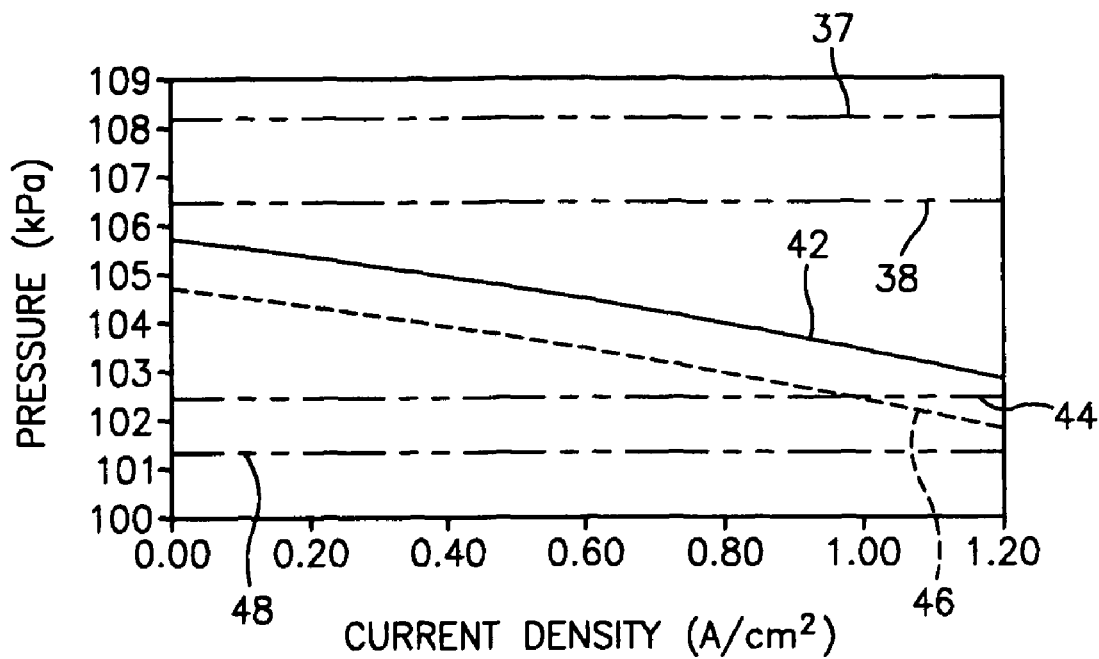
FIG. 4 shows typical coolant pressures at various locations in the cell as a function of current density in an evaporatively cooled cell.

Referring now to FIG. 4, there is shown a trace of a typical coolant flow field pressure gradient from a coolant inlet side to a coolant outlet side of the coolant flow field. The Y axis represents the hydraulic coolant pressure in kPa; and the X axis represents the average fuel cell current density over the length of the coolant flow field in A/cm².

Line 37 represents the hydraulic pressure as the coolant enters the inlet of the coolant flow field from a constant pressure reservoir (not shown). Line 38 represents the hydrophobic porous plug coolant breakthrough pressure which, if exceeded will result in coolant water penetrating the porous plug. The line 42 represents the coolant flow field outlet pressure conditions as the coolant contacts the hydrophobic porous plug. The pressure gradient line 42 is nearly linear as a function of current density. The line 44 represents a pressure which will allow air and fuel gas to flow through the porous plug. The broken line 46 indicates the flow field pressure gradient of a water coolant which contains dissolved fuel or air gases. The line 48 indicates ambient pressure.

Figure 5:
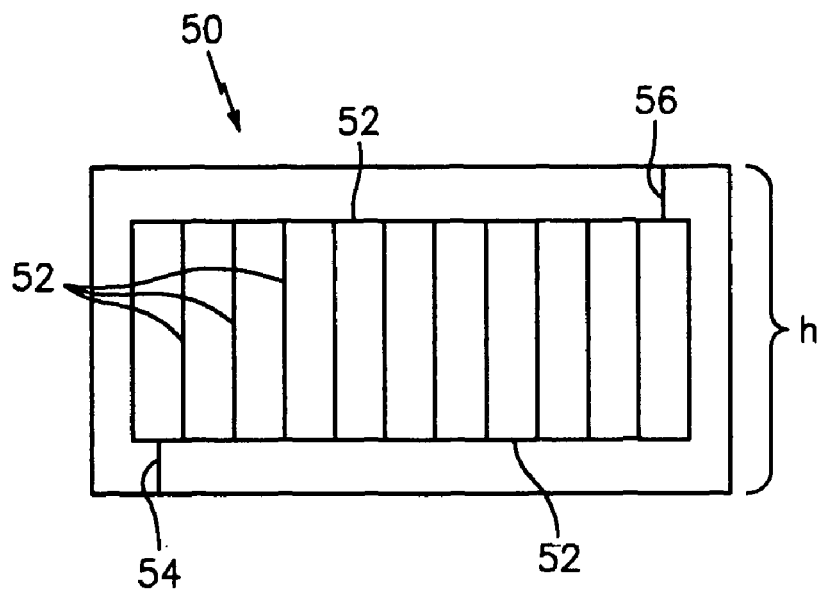
FIG. 5 is a schematic plan view of a typical coolant flow field that can be used in connection with this invention.

Referring now to FIG. 5, there is shown a schematic view of a coolant flow field structure that can be used in conjunction with this invention. The flow field structure is denoted generally by the numeral 50. As previously noted, the flow field 50 will be formed from two opposed plates, at least one of which will be water permeable so as to allow water to pass through the plate into the cathode reactant manifold where the water will evaporate in the air stream flowing through the manifold to cool the cells. The flow field 50 has a plurality of coolant channels 52 therein plus a coolant inlet channel 54 and a coolant outlet channel 56. The flow field 50 also has a known height h between the coolant inlet channel 54 and the coolant outlet channel 56.

By using the following equations, one can determine the proper coolant inlet pressure ($P_{in}$) for a particular coolant flow field which must operate in conjunction with a hydrophobic porous closure plug having a known desired coolant outlet pressure ($P_{out}$). First one must calculate the particular resistance to liquid coolant flow in the coolant flow field (dP/dQ). This can be calculated by solving the equation:

$$dP/dQ = 32\ \mu L / NAD^2;$$

wherein N is the number of coolant flow channels 52 in the flow field 50;
A is the cross sectional area of one of the coolant flow channels;
D is the hydraulic diameter of a channel;
μ is the coolant (water) viscosity; and
L is the inlet to outlet length of any one of the coolant channels 52.

it will be appreciated that N, A, D and L of a particular flow field can be determined by one designing the particular flow field. Thus, if one designs the coolant flow field geometry and the coolant fluid being used, then one can determine the coolant pressure drop changes with any particular coolant flow rate.

Once dP/dQ is determined, one can determine the desired coolant pressure at the inlet of the coolant flow field 50 by solving the following equation:

$$P_{out} = P_{in} - \rho g h - \tfrac{1}{2}(dP/dQ)Q_{93};$$

wherein, as previously noted, $P_{out}$ is a known operative coolant outlet pressure for the closure plug which has been selected for use;

ρgh is the static hydraulic pressure difference between the coolant flow field inlet, wherein g is gravity, h is the difference in the height of the coolant flow field inlet and the coolant flow field outlet, ρ is the density of the coolant; and $Q_{93}$ is the evaporation rate of the coolant.

Thus, one can design an appropriate coolant flow field that will be operative in combination with a porous hydrophobic closure plug having known parameters by following the above instructions.

It will be readily appreciated that the second phase of this invention provides a method for an improved PEM fuel cell power plant system which has a hydrophobic porous plug in the cell cooling portion of the power plant that maintains the proper operating pressure in the fuel cells of the system. The parameters of the plug can be tailored to fit known operating parameters of a PEM cell cooling system, and also the parameters of a PEM cell cooling system can be tailored to fit known parameters of a particular porous plug.

Since many changes and variations of the disclosed embodiment of the invention may be made without departing from the inventive concept, it is not intended to limit the invention otherwise than as required by the appended claims.

What is claimed is:

1. A method for designing a hydrophobic porous plug (28) for passing air from a PEM fuel cell water coolant flow field (12), said water coolant flow field having a coolant inlet (54) and a coolant outlet (56) and which contains a pressurized non-circulating water coolant which has a known coolant outlet pressure, said method comprising the steps of calculating an average pore size and a thickness for said hydrophobic porous plug which calculated average pore size and thickness will enable air to pass through said plug but prevent water from passing through said plug at said coolant flow field outlet; said step of calculating the plug pore size comprising the step of solving the equation:

$$d = \frac{4\partial \cos\emptyset}{P_b};$$

wherein: d is the average pore diameter for the plug: $\partial$ is the surface tension of water; $\emptyset$ is the contact angle between the water coolant and the surface of the plug; and $P_b$ is a bubble pressure for the plug which is greater than the coolant water pressure at the coolant flow field outlet minus the gas pressure downstream of the plug.

2. The method of claim 1 wherein said step of calculating the plug thickness L comprises:
the step of solving the equation $$L = \frac{E^3 d^2}{180(1-E)^2} \cdot \frac{\Delta P}{\mu} \cdot \frac{A}{Q};$$

wherein: E is the void volume fraction of the plug; d is the plug pore diameter; $\Delta P$ is the water coolant pressure at the flow field outlet minus the gas pressure downstream of the plug; A is the area of the plug; $\mu$ is the water coolant viscosity; and Q is the gas ingestion flow rate.

3. A method for designing a PEM fuel cell water coolant flow field (12) for use with a hydrophobic porous plug (28) having a known length and pore diameter which plug is used for passing air from a pressurized outlet (56) of the coolant flow field, said method comprising the step of selecting a coolant flow field hydraulic outlet pressure which is greater than a first known pressure at which air can pass through said plug from said water coolant and which is less than a second known pressure at which water can pass through said plug from said water coolant flow field; and the step of selecting a coolant flow field having a known number of coolant flow channels (52) having a known cross sectional area, a known hydraulic diameter, and a known flow field inlet to outlet flow field length.

4. The method of claim 3 comprising the further step of calculating the resistance to water coolant flow in the selected coolant flow field (dP/dQ) by solving the equation:

$$dP/dQ = 32\mu L/NAD^2;$$

wherein N is the number of coolant flow channels in the flow field;
A is the cross sectional area of one of the coolant flow channels;
D is the hydraulic diameter of a channel;
$\mu$ is the coolant viscosity; and
L is the length of a coolant flow channel as measured from the coolant flow field inlet to the coolant flow field outlet.

5. The method of claim 4 comprising the further step of calculating the coolant flow field inlet pressure ($P_{in}$) by solving the equation:

$$P_{out} = P_{in} - \rho g h - \frac{1}{2}(dP/dQ)Q_\Sigma; \text{ wherein}$$

$P_{out}$ is the known flow field coolant outlet pressure;
p is the density of the water coolant;
g is gravity;
h is the difference in height between the coolant flow field inlet and the coolant flow field outlet; and
$Q_\Sigma$ is the evaporation rate of the water coolant.

* * * * *

UNITED STATES PATENT AND TRADEMARK OFFICE
CERTIFICATE OF CORRECTION

| | | |
|---|---|---|
| PATENT NO. | : 7,754,364 B2 | Page 1 of 1 |
| APPLICATION NO. | : 11/326762 | |
| DATED | : July 13, 2010 | |
| INVENTOR(S) | : Robert Darling et al. | |

It is certified that error appears in the above-identified patent and that said Letters Patent is hereby corrected as shown below:

On the Title page, item: "(73) Assignee: UTC Fuel Cells LLC" should be included.

Signed and Sealed this
Fourth Day of January, 2011

David J. Kappos
*Director of the United States Patent and Trademark Office*